Figure 1:
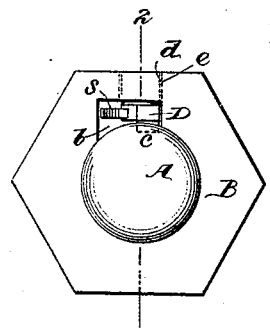

(No Model.)

H. J. VAN NEST.
NUT LOCK.

No. 520,718. Patented May 29, 1894.

WITNESSES:
William Gaebel.
C. Sedgwick

INVENTOR
H. J. Van Nest
BY
Munn & Co
ATTORNEYS.

ically straight tongue-like piece running in direction of the length of the bolt, has a lug $d$ on it arranged to enter a hole $e$ in the nut, at right angles or thereabout to the hole in the nut through which the bolt passes. This lug which holds the key in position, may be secured to the nut in any suitable manner but so as to permit of the key D having a lateral swinging motion so that when swinging in the one direction, as to the right for instance shown in Fig. 4, the thread section $c$ of it will bind against the screw threads of the bolt or its equivalent, to lock the nut from being turned to unscrew. This key D is made of steel or other suitable material and when swinging in the other direction—shown in Fig. 5—it is so far relieved from binding on or in the screw threads of the bolt as to permit of the nut being screwed up on the bolt. The friction of the screw section $c$ of the key upon or within the screw threads of the bolt will cause the key to be thus operated. Attached to the key is a spring $s$ forming a side branch of the key and bearing at its free end against the one end of the seat $b$; that lying more to one side of the axial line of the nut and bolt than the other end of the seat is necessarily deeper or projects farther into the interior of the nut than the last named end of the seat. This spring $s$ causes the locking device or key to begin to act or start the friction of the key with the bolt, after which the key binds itself with the screw threads of the bolt to lock the nut from being unscrewed. By making the slot or key seat $b$ deeper on one side than the other, increased friction or wedging of the screw section $c$ in or on the bolt is produced, as, by attempting to unscrew the nut, said key swings or moves from the deeper side or end of the seat to the shallower side or end thereof, and when the nut is turned in a reverse direction to screw it up, the reverse action or diminished friction takes place as the key is worked from the shallower side or end of the seat to the deeper side or end thereof, thus permitting of the nut being screwed up but not of being unscrewed without damaging or defacing the threads of the bolt, unless some extraneous device be introduced to release the key from the threads of the bolt.

UNITED STATES PATENT OFFICE.

HENRY JEROME VAN NEST, OF FLORENCE, COLORADO.

NUT-LOCK.

SPECIFICATION forming part of Letters Patent No. 520,718, dated May 29, 1894.

Application filed February 20, 1894. Serial No. 500,830. (No model.)

*To all whom it may concern:*

Be it known that I, HENRY JEROME VAN NEST, of Florence, in the county of Fremont and State of Colorado, have invented a new and useful Improvement in Nut-Locks, of which the following is a full, clear, and exact description.

My invention relates to that description of nut locks in which a swinging device in the nut, aided or not by a spring, is made to prevent or lock a nut from unscrewing on its screw-bolt, stud, or rod, by friction against or biting into the thread of the bolt, stud, or rod whenever there is any tendency to unscrew or turn back the nut, while it allows the nut to be turned in the other direction for the purpose of screwing it up, and my invention consists in a novel nut-lock of this description, substantially as hereinafter described, and whereby increased efficiency is obtained.

Reference is to be had to the accompanying drawings, forming a part of this specification, in which similar letters of reference indicate corresponding parts in all the views.

Figure 2:
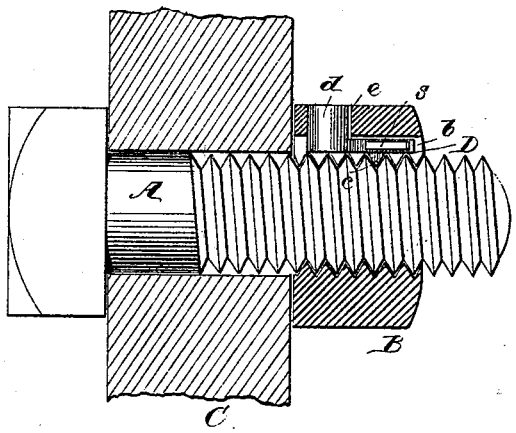
Figure 4:
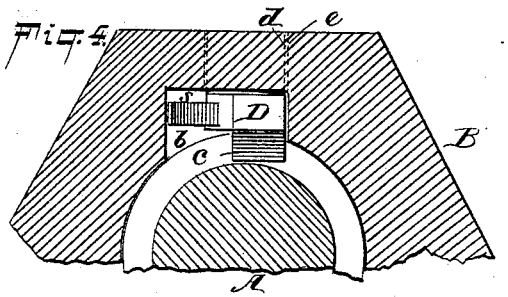
Figure 3:
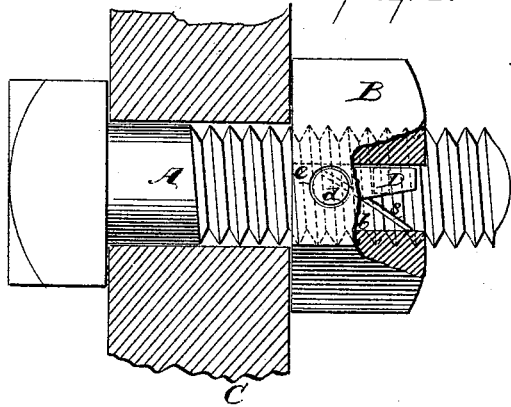
Figure 5:
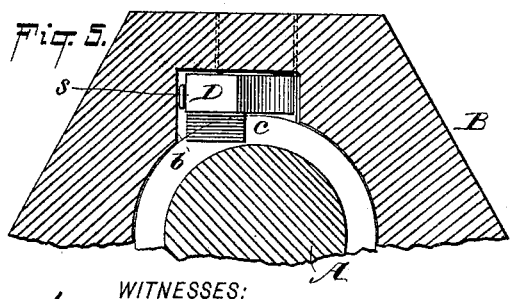
Figure 6:
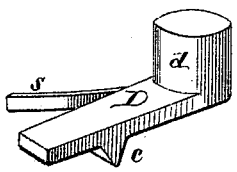

Figure 1 represents a rear face view of a nut applied to a screw bolt, with my improvement applied. Fig. 2 is a mainly sectional view upon the line 2—2 in Fig. 1. Fig. 3 is a broken plan view, in longitudinal direction with the bolt, for the purpose of more clearly exhibiting the nut locking device. Fig. 4 is a transverse section in part, with the locking device applied as locking the nut. Fig. 5 is also a transverse section in part, with the locking device in position to admit of the nut being screwed up; and Fig. 6 is a view in perspective of the locking device detached.

A is a screw bolt, or, what would be the equivalent, a screw threaded stud or rod, and B is the nut of any suitable shape screwed on said bolt, a parting piece C of any kind intervening between the nut and the head of the bolt. Said nut is made with recess or key seat $b$ parallel with the hole in the nut through which the bolt A passes and opening into said hole. This key seat is in eccentric relation with the interior of the nut. D is a key fitting within said seat which opens on the bolt. This key, which is an approximately straight tongue-like piece running in direction of the length of the bolt and provided with a sectional portion of a screw thread $c$ fitting the screw thread on

Having thus described my invention, I claim as new and desire to secure by Letters Patent—

1. In a nut-lock, the swinging key, provided with a projecting screw thread section on its face and with an attached branch spring on one side, and also with a lug adapted to enter a hole in the nut to which it is applied, substantially as and for the purposes herein set forth.

2. The combination, with a screw bolt, of the nut B, having an eccentric recess or key seat $b$, projecting farther on its one side or end than on its other side or end from the screw bolt hole in the body of the nut, and the swinging key D, having a screw thread section $c$ projecting from its inner face, an attached side spring $s$, and a lug $d$ passing out through the nut from the opposite face or back of the key, essentially as shown and described.

HENRY JEROME VAN NEST.

Witnesses:
ALBERT N. VAN NEST,
FRANCIS H. RUDDICK.